No. 740,264. PATENTED SEPT. 29, 1903.
H. FITZGERALD.
SOAP HOLDER.
APPLICATION FILED JULY 30, 1902.
NO MODEL.
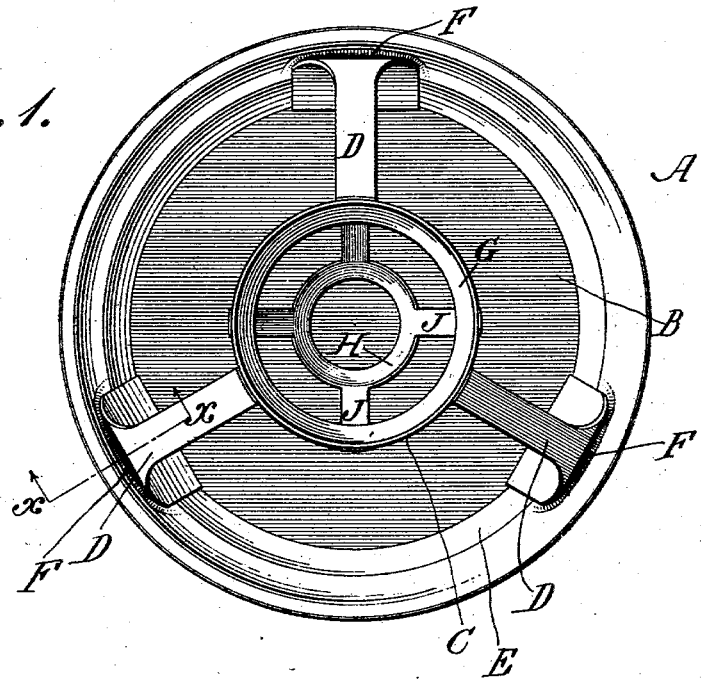
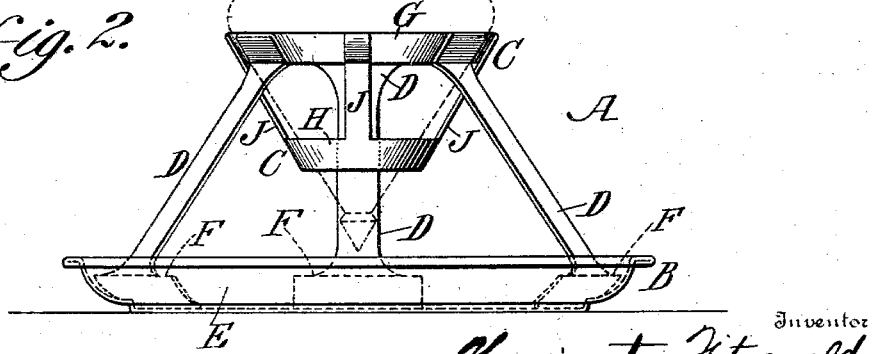

No. 740,264. Patented September 29, 1903.

UNITED STATES PATENT OFFICE.

HARRINGTON FITZGERALD, OF PHILADELPHIA, PENNSYLVANIA.

SOAP-HOLDER.

SPECIFICATION forming part of Letters Patent No. 740,264, dated September 29, 1903.

Application filed July 30, 1902. Serial No. 117,625. (No model.)

*To all whom it may concern:*

Be it known that I, HARRINGTON FITZGERALD, a citizen of the United States, residing in the city and county of Philadelphia, State of Pennsylvania, have invented a new and useful Improvement in Soap-Holders, of which the following is a specification.

My invention consists of an improved soap-holder, as will be hereinafter fully described and claimed.

Figure 1 represents the soap-holder constructed in accordance with my invention. Fig. 2 represents a side elevation thereof. Fig. 3 represents a fragmentary vertical section taken on the line $x\ x$ of Fig. 1.

A designates as a whole my improved soap-holder, the same consisting, essentially, of a base or tray B, upon and above which is suitably supported a frame or socket forming the holder C. The base or tray B in the drawings is a circular dish-shaped member, although it is understood that it can vary in shape so long as it provides a suitable base for the cup or holder C and also a tray-like receptacle to retain water and drippings from the cake of soap, that is carried by said holder C. The said holder C is conveniently supported centrally with relation to the tray B by means of a plurality of arms D. These arms are inclined inwardly, so as to converge from said tray to said socket, and they are rigidly secured to said tray and socket, and their lower ends are suitably fastened to the tray, preferably as best shown in Fig. 3—that is to say, to the side or periphery E thereof and a little below the rim—so as to provide a channel or trough F. This channel or trough F is designed to receive any water or drippings running down the arms D from the holder and to direct the same into the tray, and thus prevent such water or drippings from running upon the side thereof. It will be noted that the central portion of the tray is unobstructed, so that it may be readily cleaned. The upper ends of the arms D are secured to the holder C, as shown. The said holder C may be variously constructed; but as a preferred form of construction I make use of a skeleton frame consisting of circular upper and lower rings G and H, connected by upright pieces J, the upper ring G being connected with arms D. The frame or holder represents as a whole the form of an inverted frustum of a cone, it being noted that the sides and lower ends are open, so that the cake of soap K (shown in Fig. 2) is easily seated and can be readily removed therefrom.

It will be seen from the foregoing description that I provide a soap-holder in which the danger of upsetting is reduced to a minimum, which is inexpensive in construction, and which, furthermore, by reason of the simplicity of construction and its skeleton or frame like form can be readily and easily cleaned.

Having thus described my invention, what I claim as new, and desire to secure by Letters Patent, is—

1. A soap-holder consisting of a base-tray, converging arms rising therefrom and connected therewith, and a socket of the form of a frustum of an inverted cone, said socket being secured to the upper ends of said arms and suspended in the same, being open at the top, bottom and sides.

2. In a soap-holder, a base-tray, a socket of the form of the frustum of an inverted cone, arms converging from said tray to said socket and being rigidly connected with said parts, and channels between the rim of said tray and the adjacent outer sides of said arms.

HARRINGTON FITZGERALD.

Witnesses:
JOHN A. WIEDERSHEIM,
E. HAYWARD FAIRBANKS.